Jan. 13, 1925.
W. H. CURTIS
1,523,055
WATER CURRENT MOTOR
Filed Aug. 22, 1921
5 Sheets-Sheet 3

Inventor:
William H. Curtis
By James N. Ramsey
Attorney.

Jan. 13, 1925. 1,523,055
W. H. CURTIS
WATER CURRENT MOTOR
Filed Aug. 22, 1921 5 Sheets-Sheet 4

Inventor:
William H. Curtis
By James N. Ramsey
Attorney:

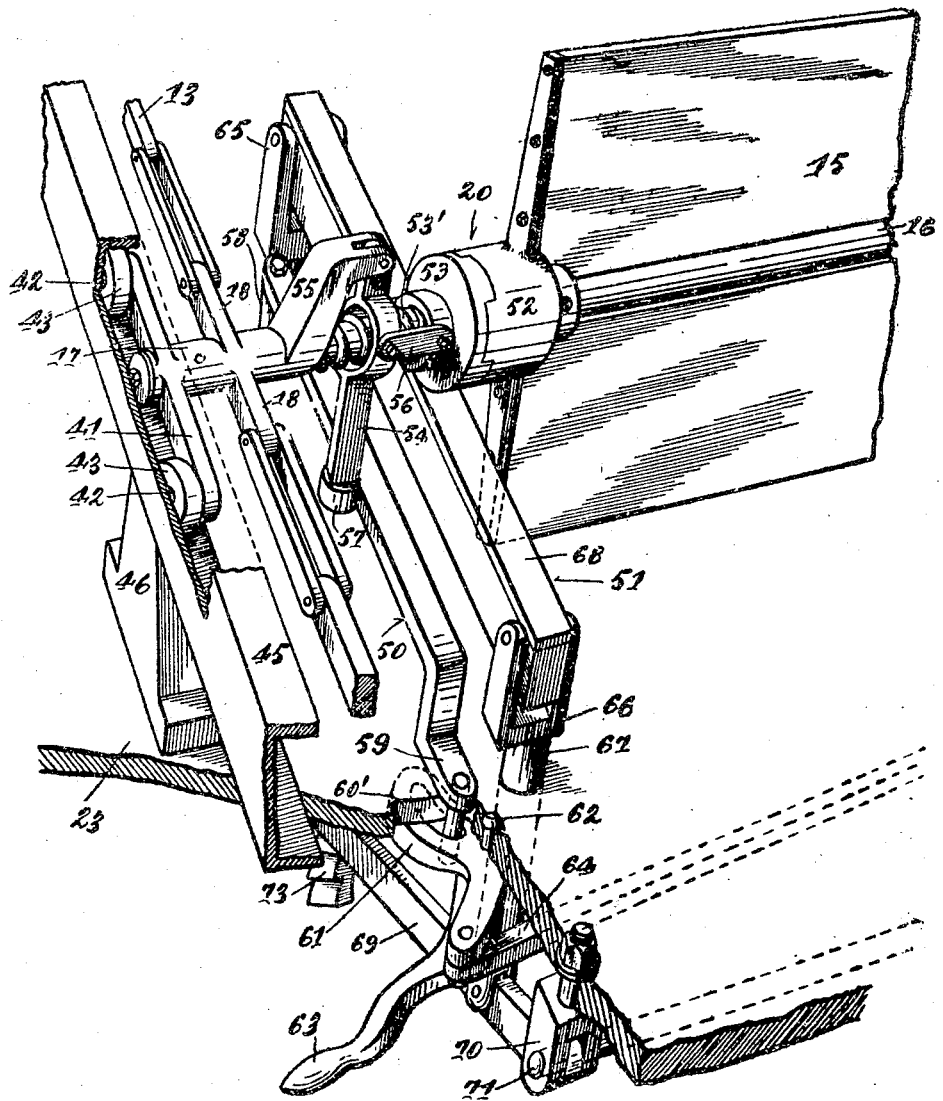

Patented Jan. 13, 1925.

1,523,055

UNITED STATES PATENT OFFICE.

WILLIAM H. CURTIS, OF WEST BADEN, INDIANA.

WATER-CURRENT MOTOR.

Application filed August 22, 1921. Serial No. 494,307.

*To all whom it may concern:*

Be it known that I, WILLIAM H. CURTIS, a citizen of the United States, residing at West Baden, in the county of Orange and State of Indiana, have invented certain new and useful Improvements in Water-Current Motors, of which the following is a specification.

My invention relates to a power motor for use in running streams, rivers or other flowing bodies of water, in which there is a current.

An object of my invention is to provide efficient means for converting the force of water currents into mechanical power which is adapted to generate electricity, pump water or to propel machinery through mechanical means connected therewith, without requiring the building of dams, or otherwise confining the water in flumes or other artificial channels.

My invention consists in providing a floating support which is adapted to be suitably anchored and which has mounted thereon a power driving means actuated by a series of endless chains carrying a series of water driven paddles.

My invention also consists in the details of construction, in the parts and combination and arrangement of parts, as herein set forth and claimed.

The foregoing and other objects are attained in the water current motor described in the following specification and illustrated in the accompanying drawings in which.

Figure 1:
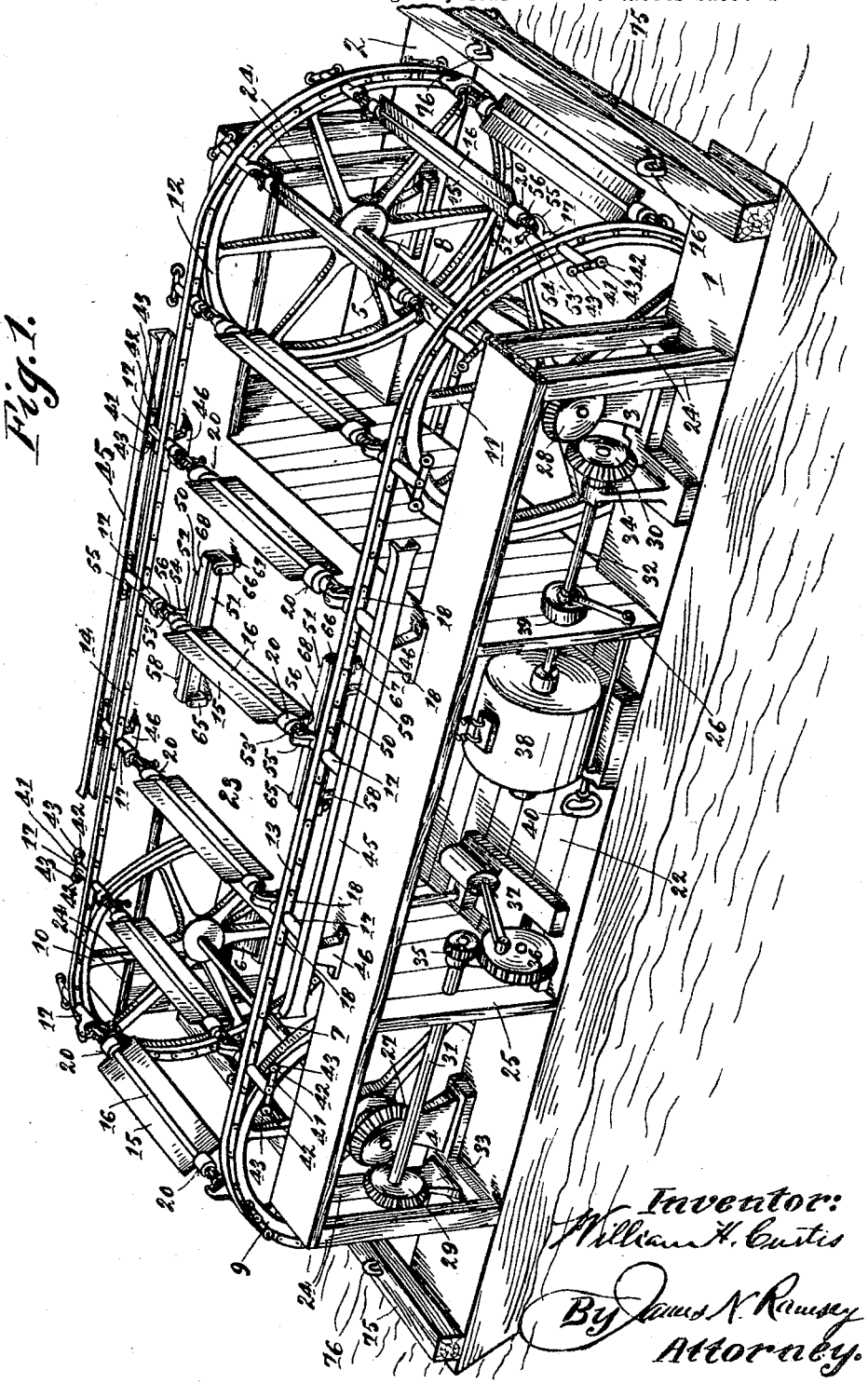
Fig. 1 is a perspective view of the water current motor embodying my invention, showing the parts in position for operation.
Figure 2:
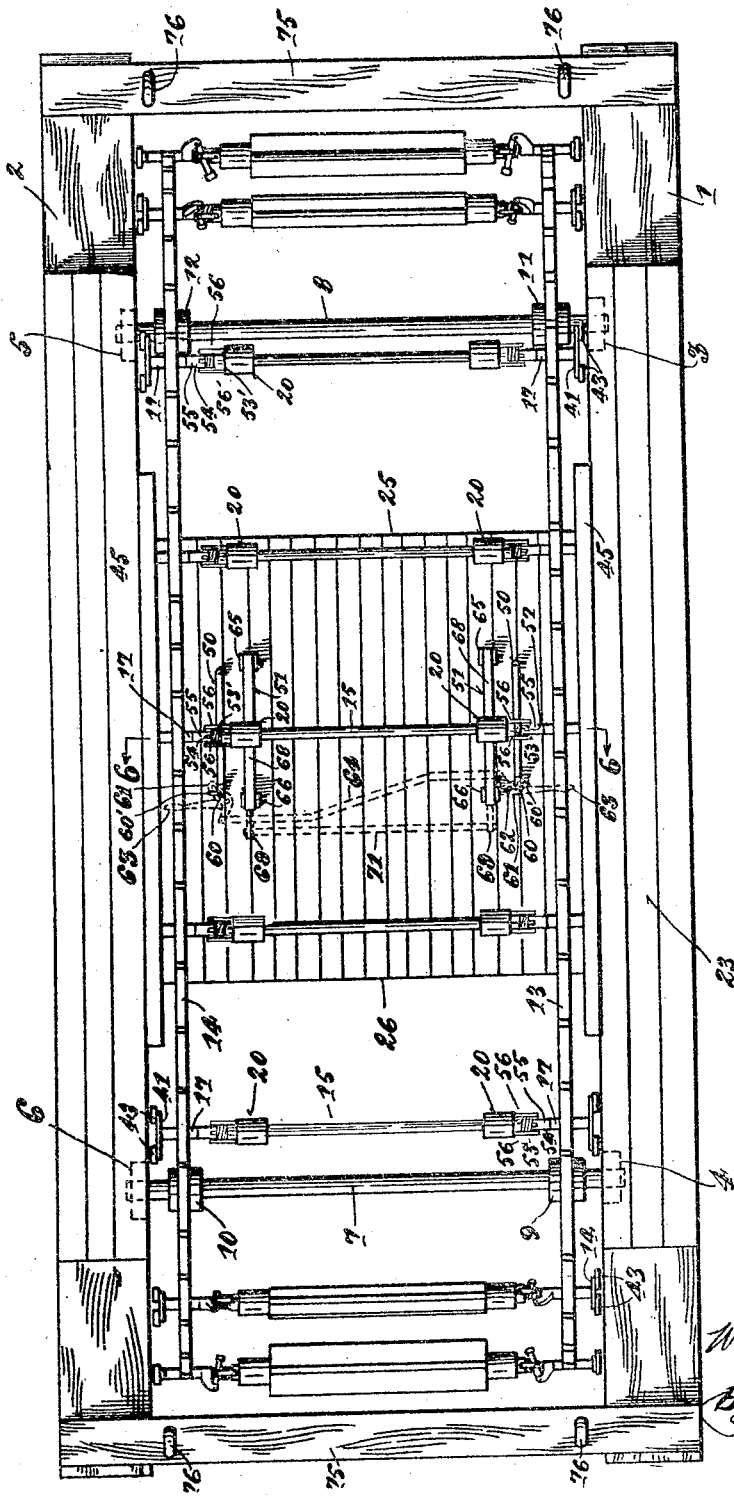
Fig. 2 is a plan view of the water current motor shown in Fig. 1.
Figures 3, 6:
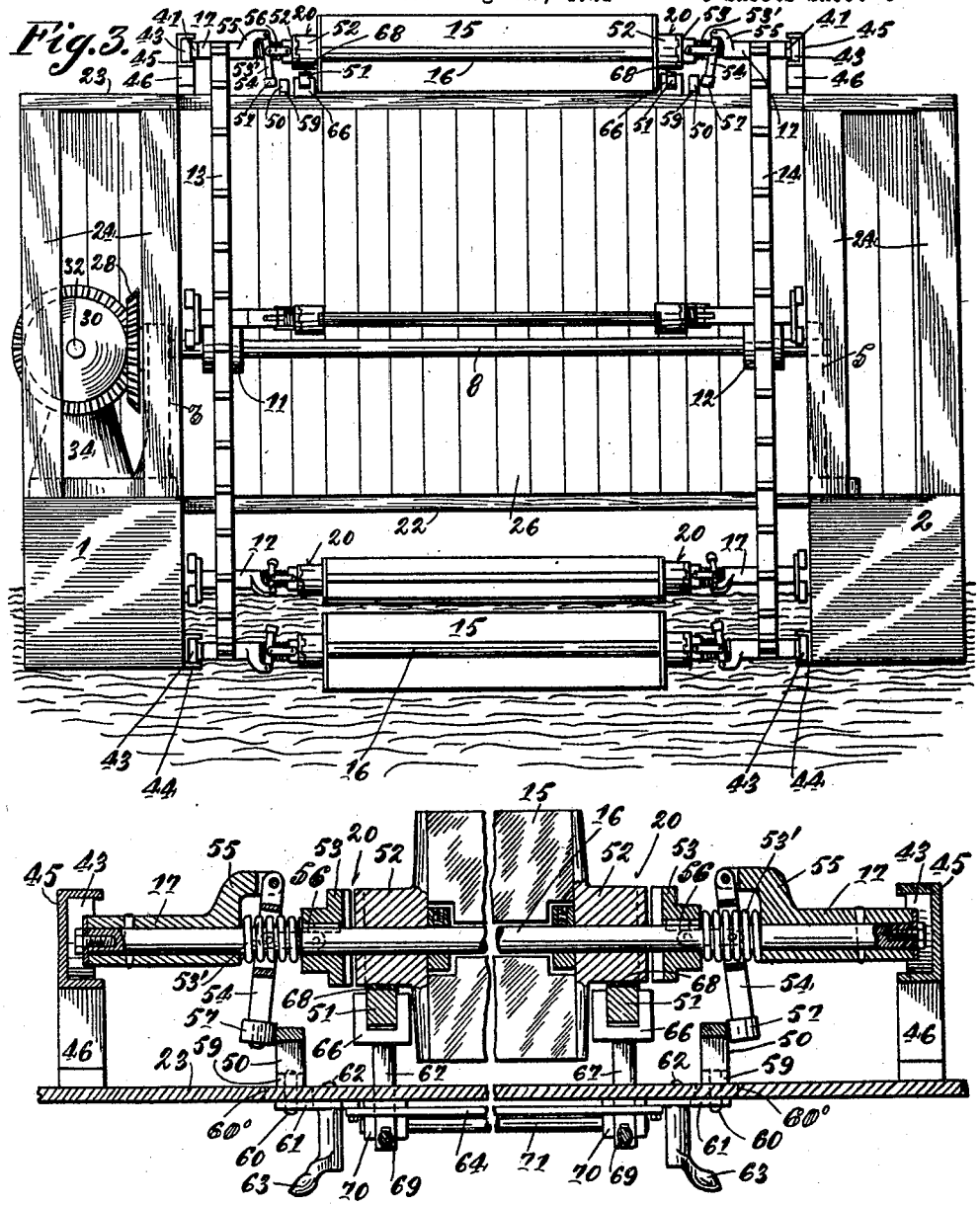
Fig. 3 is an end view of the motor.
Figure 4:
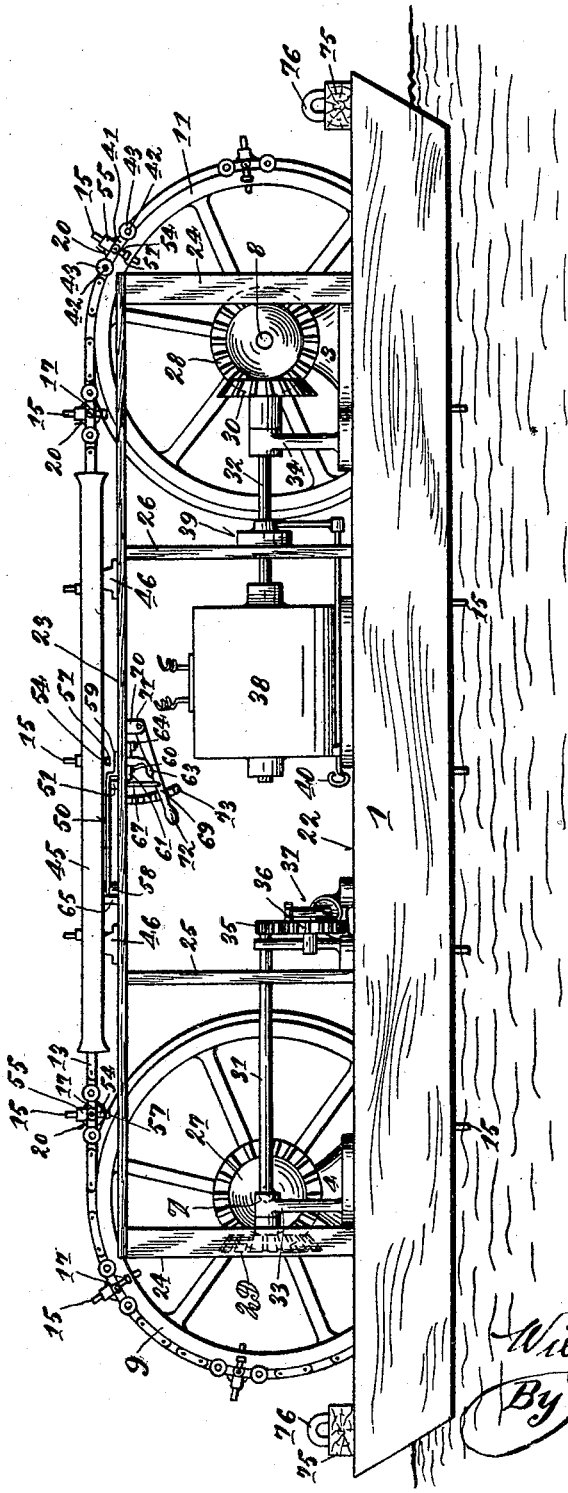
Fig. 4 is a side elevation.

Fig. 5 is an enlarged perspective view of the means for releasing the clutch to trip the water driven paddles automatically so that they may be turned from vertical to horizontal position for stopping the motor, and so that they may be turned from horizontal to vertical position for starting the motor; and Fig. 6 is a vertical section of the same taken on the line 6—6 of Fig. 2 showing the parts in the position they assume when the motor is being stopped.

In the embodiment of my invention as illustrated and which shows a preferred construction, 1 and 2 represent the floating supports, support 1 carrying bearings 3 and 4 and support 2 carrying bearings 5 and 6. Bearings 4 and 6 carry a shaft 7 and bearings 5 and 3 carry a shaft 8. Sprocket wheels 9 and 10 are mounted upon shaft 7 adjacent to the respective bearings 4 and 5 and a cooperating pair of sprocket wheels 11 and 12 are mounted upon shaft 8 adjacent to the respective bearings 3 and 6. Over the sprocket wheels 9 and 11 a chain 13 passes, and over the sprocket wheels 10 and 12 a chain 14 passes. Between the chains 13 and 14 a series of paddles 15 are rotatively mounted upon shafts 16 which are firmly secured in carriers 17 which are inserted in the chains and connected thereto by ears 18. At each end of the paddle a clutch 20 is located, this clutch being so arranged that the paddles may be securely held or locked in either vertical or horizontal position, the details of this clutch being hereinafter more fully described. The floating supports or pontoons 1 and 2, which support the above described mechanism are spaced apart to permit the sprockets and chains to be located between them, the lower portions of the chains 13 and 14 passing into and occupying the water between the pontoons, so that the paddles carried thereby are immersed.

The pontoons are suitably spaced apart by a structure which supports a platform 22 having an overhead or deck construction 23 which is supported by a series of posts 24. Partitions 25 and 26 extend from the deck 23 to the platform 22 and are located close to the sprockets and between them to prevent splashing from the sprockets onto the platform 22 and the machinery carried thereby.

On the ends of the shafts 7 and 8, gears 27 and 28 are mounted, these gears being used to drive the machinery located on the platform 22. Gears 27 and 28 mesh with the respective gears 29 and 30 on the shafts 31 and 32 extending longitudinally of the structure. These shafts 31 and 32 are mounted in bearings 33 and 34 located at right angles to the bearings 3 and 4 adjacent thereto for holding gears 29 and 30 in engagement with gears 27 and 28. On the inner end of shaft 31 I have shown a pinion 35 which meshes with a gear 36 of a pump 37 located on the platform 22. Operatively associated with shaft 32 I have shown dynamo 38 which is also mounted upon platform 22, but which is arranged for disconnection or connection with relation to shaft 32 by means of a clutch 39, an operating handle 40 for which, is shown in accessible position from the platform 22.

The carriers 17 adapted to travel with the chains 13 and 14 as they pass above the deck 23, have yokes 41 integrally formed therewith. The yokes have studs 42 secured therein on which rollers 43 are journaled. The rollers run in submerged channel tracks 44 secured to the pontoons and also in channel tracks 45 which rest on standards 46 secured to the deck 23. These tracks in this manner support the chains at points where mechanism, which will now be described, is located for the operation of the clutches 20 and the rotation of the paddles 15. There are preferably one of these mechanisms at each end of the paddle boards mechanically connected and operable from either side of the platform. This mechanism consists of two elements 50 and 51 which are employed for operating the clutches and for rotating the paddles, respectively, and are more clearly shown in Figs. 5 and 6 to which reference is now made. The clutch consists of two members 52 and 53, 52 being secured to the paddle board, and member 53 being splined to shaft 16 and held stationary with relation to member 52. A spring 53' received about the shaft 16 between the carrier 17 and the clutch member 53 normally holds the clutch members in engagement. An operating lever 54 pivoted to bracket 55 on the carrier 17 has links 56 articulated thereto and also to the clutch member 53.

The operating lever 54 has a roller 57 at its lower end adapted to coact with element 50 to cause disengagement of the clutch. Element 50 is pivotally mounted on a post 58 extending from deck 23. A foot 59 on element 50 carries a pin 60 which extends through a slot 60' in the deck 23. Pin 60 cooperates with slotted cam 61 which is pivoted at point 62 on the underside of the deck and has handle 63 which may be operated to swing the cam to cause the pin 60 to ride in its slot and thereby to swing element 50 upon its pivot 58. A cross link 64 connects the slotted cams on opposite ends of the paddle boards for combined operation of the elements 50. This position is shown in Fig. 6. Element 51 is pivoted in a fork 65 extending upwardly from deck 23, the opposite end of the element being connected to fork 66 which is mounted upon pin 67 extending through the deck and reciprocally therein for raising and lowering element 51 to cause rotation of the member 52 of the clutch. Element 51 has its upper edge covered with a material such as leather 68 which affords friction enough to rotate member 52 and paddle 15 connected therewith, when the element is raised. Pin 67 is connected with lever 69 which is pivotally mounted in fork 70 on a cross shaft 71 which extends to the other end of the paddle board whereby a similar element 51 is simultaneously operated. A handle 72 is provided on lever 69 and operates in conjunction with curved rack 73 for securing handle 69 in one or the other of the raised or lowered positions of element 51.

To anchor the water current motor, cross beams 75 are firmly secured to and connect the pontoons adjacent their ends. The cross beams have eye bolts 76 secured therein to which suitable hawsers may be attached.

In the operation of my improved water current motor the machine is started by rotating the shafts 7 and 8 by means of the motor dynamo 38, which serves to bring the paddles 15, which are assumed to have been in horizontal positions, into vertical positions upon engagement of the clutch members 52 with the leather face 68 of element 51, which has previously been raised by lever 69.

In order to disengage the paddle clutches the element 50 will have previously been moved to cause disengagement of the clutch members. The elements 50 and 51 are so proportioned that lever 54 rides off of element 50 immediately upon or slightly previous to the assumption to vertical position of each paddle. As soon as the first of the vertically positioned paddles reaches the water, the current bearing against the paddle has a tendency to force it along and to carry with it the chains 13 and 14 carrying the successive paddles which have been moved to vertical position as they passed elements 50 and 51. As the number of vertically positioned paddles is increased beneath the surface of the stream, the tractive effort exerted by the paddles upon the machinery to be driven is also increased as well as the speed with which the shafts 7 and 8 are rotated. This increase of speed and power permits of throwing in more and more elements to be driven thus permitting of the placing of an increased load upon the water current motor.

When it is desired to stop the water current motor it is but necessary to raise element 51 and to again move element 50 into position to engage levers 54 of the clutches so as to disengage them. The result of this is that the clutches are disengaged upon presenting themselves in contact with element 50, thus permitting element 51 to again rotate the paddles partially and thus bring them once more into horizontal position wherein the water current will have no driving effect upon them. As soon as the last of the vertically positioned paddles leaves the water, the motor will stop, all of the other paddles having been moved to horizontal position by this time. It is but necessary in starting the motor, to repeat the process of connecting the motor-dynamo with the propelling mechanism as previously described and through this agency cause the paddles to again be moved to vertical position for driving impingement with the water of the stream. It will be understood that immediately upon movement of all the paddles to vertical position, the elements 50 and 51 will be moved to positions out of engagement with clutch member 52 and lever 54. If this were not done the paddles would be continually passing through the operation of being moved from vertical to horizontal position and from horizontal position again to vertical position.

Various modifications may be made without departing from the spirit and scope of my invention, and its use need not be confined to the driving of pumps or dynamos, such as I have illustrated. For example, the motor may be used in driving other machinery such as machine tools, which makes the entire structure a self contained floating machine shop for use in river harbors where construction and repair work is to be done.

Having thus described my invention, what I claim is:

1. A water current motor comprising a float, shafts journaled at opposite ends of the floats, wheels on the shafts, a flexible member passing over the wheels, a paddle on the member for engagement with the water adapted to be driven by the current thereon and a clutch for disengagement of said paddle from said water.

2. In a water current motor, the combination of a float, shafts journaled at opposite ends of the float, wheels on the shafts, a flexible member passing over the wheels, paddles on the member at spaced intervals, clutches for rotating said paddles in or out of engagement with the water and means for connecting the shafts with machinery on the float.

3. In combination in a water current motor, a pair of floats spaced apart, shafts journaled at opposite ends of the floats and between them, sprocket wheels on the shafts and entering the water, a chain on the sprocket wheels, a series of paddles on the chains, each paddle having a clutch for engagement of said paddles with the water, a machinery carrying deck between the spockets and the floats, and means adapted to connect the shafts with machinery on the deck.

4. A water current motor comprising a float, shafts journaled at opposite ends of the float, wheels on the shafts, a flexible member passing over the wheels, a paddle pivotally mounted on the member, a clutch for rotating said paddle in engagement with the water and means for rotating the wheels on the shaft for changing positions of said paddle.

5. In a water current motor, the combination of a float, shafts journalled at opposite ends of the float, wheels on the shafts, a flexible member passing over the wheels, paddles rotatively mounted on the member at spaced intervals, clutches on the paddles to lock them in and out of driving engagement with the water, manually operated paddle rotating mechanism operative from the float, and means connecting the shafts with machinery on the float.

6. In combination in a water current motor, a pair of floats spaced apart, shafts journalled at opposite ends of the floats and between them, sprocket wheels on the shafts and entering the water, chains on the sprocket wheels, a series of paddles pivotally mounted on the chains and between them, clutches on the paddles to lock them in and out of driving engagement with the water, manually operative paddle rotating and clutch releasing mechanism, a machinery carrying deck between the sprockets and the floats, and means adapted to connect the shafts with machinery on the deck.

WILLIAM H. CURTIS.